US011455054B2

(12) United States Patent
Perez et al.

(10) Patent No.: US 11,455,054 B2
(45) Date of Patent: Sep. 27, 2022

(54) MULTI-PROTOCOL COEXISTENCE IN AN ACTIVE STYLUS

(71) Applicant: Microsoft Technology Licensing, LLC, Redmond, WA (US)

(72) Inventors: Ahia Perez, Ramat gan (IL); On Haran, Kfar Saba (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/818,319

(22) Filed: Mar. 13, 2020

(65) Prior Publication Data

US 2021/0286494 A1    Sep. 16, 2021

(51) Int. Cl.
   *G06F 3/033*   (2013.01)
   *G06F 3/041*   (2006.01)
   *G06F 3/0354*  (2013.01)
   *G06F 3/038*   (2013.01)

(52) U.S. Cl.
   CPC ........ *G06F 3/04162* (2019.05); *G06F 3/0383* (2013.01); *G06F 3/03545* (2013.01)

(58) Field of Classification Search
   CPC . G06F 3/03545; G06F 3/04883; G06F 3/0488
   See application file for complete search history.

(56) References Cited

U.S. PATENT DOCUMENTS

| 10,481,705 B2 | 11/2019 | Qiao et al. |
| 2012/0083208 A1 | 4/2012 | Giles et al. |
| 2015/0050879 A1* | 2/2015 | MacDuff .............. H04B 5/0031 455/39 |
| 2015/0173108 A1 | 6/2015 | Thangella |
| 2016/0110302 A1 | 4/2016 | Chazot et al. |
| 2017/0177145 A1 | 6/2017 | Hara et al. |

(Continued)

FOREIGN PATENT DOCUMENTS

TW    I552027 B    10/2016

OTHER PUBLICATIONS

"Tips and Tricks—Pairing Bluetooth Speakers to a Phone, Tablet, or Other Compatible Device", Retrieved from: https://www.ionaudio.com/kb/tips-tricks-pairing-bluetooth-speakers-to-a-phone-tablet-or-other-compatible-device/, Retrieved Date: Jan. 17, 2020, 11 Pages.

*Primary Examiner* — Nan-Ying Yang
(74) *Attorney, Agent, or Firm* — International IP Law Group, PLLC

(57) ABSTRACT

A method, computing system, and one or more computer-readable storage media for operating an active stylus equipped with a stylus capture detection routine. The method includes operating the stylus according to a first communication protocol to enable communication with a first display device. The method also includes detecting a beacon from a second display device operating according to a second communication protocol. The method also includes automatically switching the stylus to the second communication protocol in response to detecting the beacon. The method also includes detecting a stylus capture event indicating that switching the stylus to the second communication protocol was erroneous and is preventing the user from communicating with the first display device and, in response to detecting the stylus capture event, switching the stylus back to the first communication protocol.

25 Claims, 9 Drawing Sheets

(56) References Cited

U.S. PATENT DOCUMENTS

| | | |
|---|---|---|
| 2018/0120962 A1 | 5/2018 | Hara et al. |
| 2018/0120963 A1 | 5/2018 | Hara |
| 2018/0246587 A1* | 8/2018 | Dekel .................. G06F 3/0442 |
| 2019/0102021 A1* | 4/2019 | Jang ...................... G06F 3/0383 |
| 2019/0129524 A1* | 5/2019 | Kim ....................... G06F 3/0383 |
| 2019/0146602 A1 | 5/2019 | Kadowaki et al. |

* cited by examiner

MULTI-PROTOCOL COEXISTENCE IN AN ACTIVE STYLUS

BACKGROUND

An active stylus is a pen-like electronic device that can be used to provide input to an electronic display device. The active stylus provides additional features and greater control compared to user interaction based on simple finger touch. For example, an active stylus may provide more precise control over screen positioning and provides additional input features such as tilt detection, pressure detection, input buttons, and the like. To enable user interactions, the active stylus and the associated display device may be configured to synchronize with one another to maintain a shared sense of time. The synchronization may be accomplished through the use of a pre-programmed communication protocol.

SUMMARY

The following presents a simplified summary of the subject innovation in order to provide a basic understanding of some aspects described herein. This summary is not an extensive overview of the claimed subject matter. It is intended to neither identify key or critical elements of the claimed subject matter nor delineate the scope of the subject innovation. Its sole purpose is to present some concepts of the claimed subject matter in a simplified form as a prelude to the more detailed description that is presented later.

An embodiment provides a method for operating a stylus. The method includes operating the stylus according to a first communication protocol to enable communication with a first display device. The method also includes detecting a beacon from a second display device operating according to a second communication protocol. The method further includes automatically switching the stylus to the second communication protocol in response to detecting the beacon. The method further includes detecting a stylus capture event indicating that switching the stylus to the second communication protocol was erroneous and is preventing the user from communicating with the first display device, and switching the stylus back to the first communication protocol in response to detecting the stylus capture event.

Another embodiment provides an active stylus that includes transmitter circuitry for sending electrical signals to a digitizer of a display device, and receiver circuitry for receiving electrical signals from the digitizer of the display device. The active stylus also includes a processor for operating the active stylus according to a first communication protocol compatible with a first display device, or a second communication protocol compatible with a second display device. The processor is configured to operate the stylus according to the first communication protocol upon waking, and listen for beacons indicating the presence of the second display device operating according to the second communication protocol, and automatically switch the stylus to the second communication protocol if a beacon is detected. The process is also to perform a stylus capture detection routine while operating according to the second communication protocol, wherein the stylus capture detection routine is to determine whether a user is attempting to use the active stylus with the first display device. If the stylus capture detection routine detects a stylus capture event, the process switches the stylus back to the first communication protocol.

In addition, another embodiment provides one or more computer-readable storage media for storing computer-readable instructions. The computer-readable instructions provide a system for detecting a stylus capture event in an active stylus. The instructions, when executed, are configured to operate the stylus according to the first communication protocol upon waking, and listen for beacons indicating the presence of a display device operating according to the second communication protocol, and automatically switch the stylus to the second communication protocol if a beacon is detected. The instructions, when executed, also perform a stylus capture detection routine while operating according to the second communication protocol, and if the stylus capture detection routine detects a stylus capture event, the instructions cause the stylus to switch back to the first communication protocol.

The following description and the annexed drawings set forth in detail certain illustrative aspects of the claimed subject matter. These aspects are indicative, however, of but a few of the various ways in which the principles of the innovation may be employed and the claimed subject matter is intended to include all such aspects and their equivalents. Other advantages and novel features of the claimed subject matter will become apparent from the following detailed description of the innovation when considered in conjunction with the drawings.

DETAILED DESCRIPTION

Figure 1:
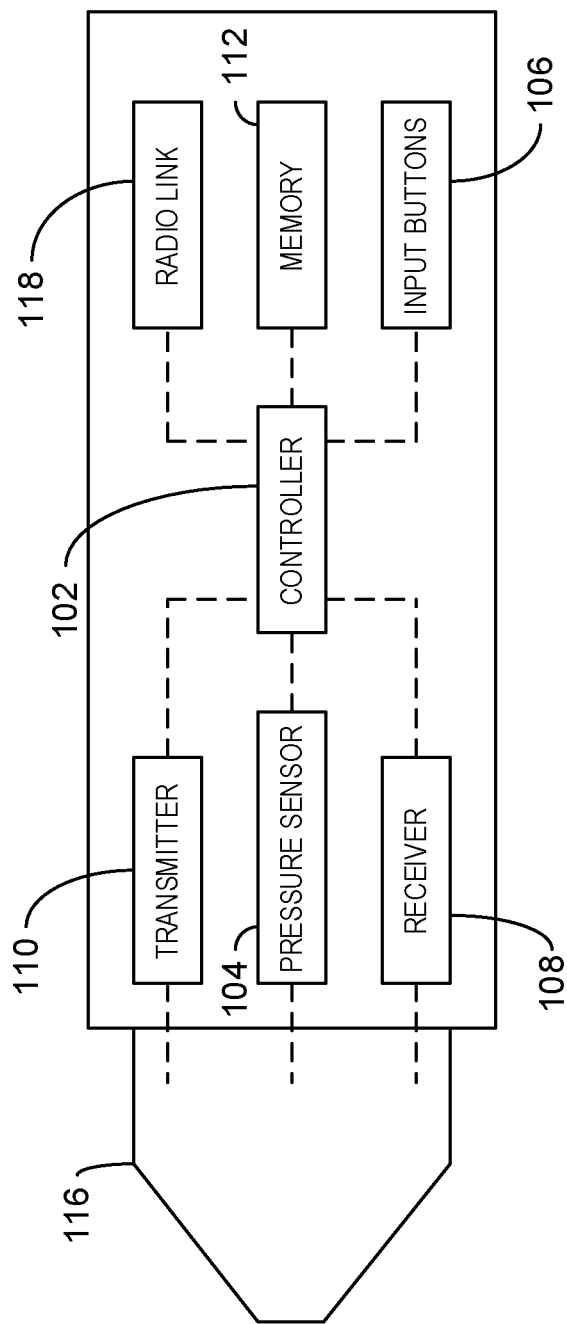
FIG. 1 shows an example of an active stylus configured with anti-capture circuitry.

To make an active stylus more versatile, the active stylus may support more than one communication protocol and may be capable of communication with various display devices. Each protocol describes a process that enables the stylus and the display to become time synchronized to facilitate communication. If the active stylus is in the vicinity of multiple display devices, signals from one of the display devices may cause the active stylus to inadvertently switch to the wrong communication protocol, such that operation of the active stylus with the intended display device may be interrupted.

Some example protocols include the Microsoft Pen Protocol (MPP) 2.0 and 2.5 OutCell protocols and the MPP 2.5 InCell protocol. In the OutCell protocols, the synchronization is initiated by the stylus, meaning that the stylus transmits a synchronization signal and the display screen adjusts its timing to match the timing of the stylus. In the InCell protocol, the synchronization is initiated by the display's digitizer, meaning that the digitizer transmits the synchronization signal and the stylus adjusts its timing to match the timing of the display's digitizer.

The OutCell protocol tends to be used by smaller display screens such as cell phones, tablet computers, and the like, while the InCell protocol tends to be used by larger display screens and involves the use of high gain signals that enable communication with an active stylus over larger distances. An active stylus may be configured to use both protocols so that it can be used to communicate with a wider variety of display devices. In a stylus that uses both protocols, the stylus may be configured to wake up in the OutCell protocol. The OutCell protocol has time slots during which the stylus listens for beacons transmitted by an InCell device. If InCell beacons are detected, the stylus can automatically switch to the InCell protocol and adjusts its timing to match the timing of the display.

The use of more than one communication protocol in the stylus may result in an effect referred to herein as "stylus capture." A stylus capture event may occur if the user of the stylus is attempting to ink on an OutCell device in the proximity of an InCell device. In this situation, the stylus may detect an InCell beacon and switch to the InCell protocol, thereby preventing communication between the stylus and the OutCell device. More generally, a stylus capture event may occur when a first device operating under a first communication protocol takes or redirects a signal intended for use by a second device operating under a second communication protocol, thus depriving the first device of the signal. In some cases, a stylus capture event can also occur between two InCell devices that are in close proximity to each other. This may occur, for example, when one InCell device causes the active stylus to synchronize to its timing when the user is attempting to ink on a different InCell device.

The present specification describes techniques to prevent stylus capture. In various embodiments, the stylus is configured to detect that a stylus capture event has occurred and takes measures to correct the stylus capture and prevent further instances of stylus capture. For example, if a stylus capture event is detected, the stylus may be configured to switch back to the OutCell protocol and reduce its sensitivity to reduce the likelihood that the InCell beacons will be detected.

The present techniques may be described in reference to the InCell and OutCell protocols. However, the techniques described herein may be applied to other active stylus communication protocols. Throughout the present description, reference may be made to a first protocol (e.g., OutCell) and a second protocol (e.g., InCell). The first protocol uses stylus-initiated synchronization and is the default protocol used by the stylus upon waking, i.e., when the stylus is first activated or powered on. The first protocol includes at least one time window during which the stylus will listen for a signal indicating the presence of a display device that uses the second protocol. Upon detection of such a signal, the stylus may then optionally switch to the second protocol. The second protocol uses display initiated synchronization.

As a preliminary matter, some of the figures describe concepts in the context of one or more structural components, variously referred to as functionality, modules, features, elements, or the like. The various components shown in the figures can be implemented in any manner, such as via software, hardware (e.g., discrete logic components), firmware, or any combinations thereof. In some embodiments, the various components may reflect the use of corresponding components in an actual implementation. In other embodiments, any single component illustrated in the figures may be implemented by a number of actual components. The depiction of any two or more separate components in the figures may reflect different functions performed by a single actual component. FIG. 1, discussed below, provides details regarding one system that may be used to implement the functions shown in the figures.

Other figures describe the concepts in flowchart form. In this form, certain operations are described as constituting distinct blocks performed in a certain order. Such implementations are exemplary and non-limiting. Certain blocks described herein can be grouped together and performed in a single operation, certain blocks can be broken apart into plural component blocks, and certain blocks can be performed in an order that differs from that which is illustrated herein, including a parallel manner of performing the blocks. The blocks shown in the flowcharts can be implemented by software, hardware, firmware, manual processing, or the like. As used herein, hardware may include computer systems, discrete logic components, such as application specific integrated circuits (ASICs), or the like.

As to terminology, the phrase "configured to" encompasses any way that any kind of functionality can be constructed to perform an identified operation. The functionality can be configured to perform an operation using, for instance, software, hardware, firmware, or the like.

The term "logic" encompasses any functionality for performing a task. For instance, each operation illustrated in the flowcharts corresponds to logic for performing that operation. An operation can be performed using, for instance, software, hardware, firmware, or the like.

As used herein, the terms "component," "system," "client," "server," and the like are intended to refer to a computer-related entity, either hardware, software (e.g., in execution), or firmware, or any combination thereof. For example, a component can be a process running on a processor, an object, an executable, a program, a function, a library, a subroutine, a computer, or a combination of software and hardware.

By way of illustration, both an application running on a server and the server can be a component. One or more components can reside within a process, and a component can be localized on one computer and/or distributed between two or more computers. The term "processor" is generally understood to refer to a hardware component, such as a processing unit of a computer system.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable storage device or media.

Computer-readable storage media can include but are not limited to magnetic storage devices (e.g., hard disk, floppy disk, and magnetic strips, among others), optical disks (e.g., compact disk (CD) and digital versatile disk (DVD), among others), smart cards, and flash memory devices (e.g., card, stick, and key drive, among others). In contrast, computer-readable media (i.e., not storage media) generally may additionally include communication media such as transmission media for wireless signals and the like.

FIG. 1 shows an example of an active stylus configured with anti-capture circuitry. The active stylus 100 can be any type of electronic pen or stylus capable of writing, i.e., generating digital ink, on a display screen of a computing device, such as tablet computers or smart phones, for example. The display screen circuitry that enables communication with the active stylus 100 may be referred to herein as a digitizer. The active stylus 100 is schematically shown in simplified form. The active stylus includes a controller 102 configured to perform various operations discussed herein. For example, the controller 102 may be configured to receive signals from various sensors such a pressure sensor 104, input buttons 106, and the like. Further, the controller 102 may be configured to process signals received from the electrode of the digitizer through a receiver 108 and send signals to the electrode of the digitizer through a transmitter 110. The controller 102 may be any suitable type of processor, including an Application Specific Integrated Circuit (ASIC), microcontroller, and others. The controller 102 may also include or be coupled to a memory device 112 that stores data, including instructions to be processed by controller 102. The memory device 112 can be any suitable type of volatile or non-volatile memory device, including flash memory, and others.

Figure 2:
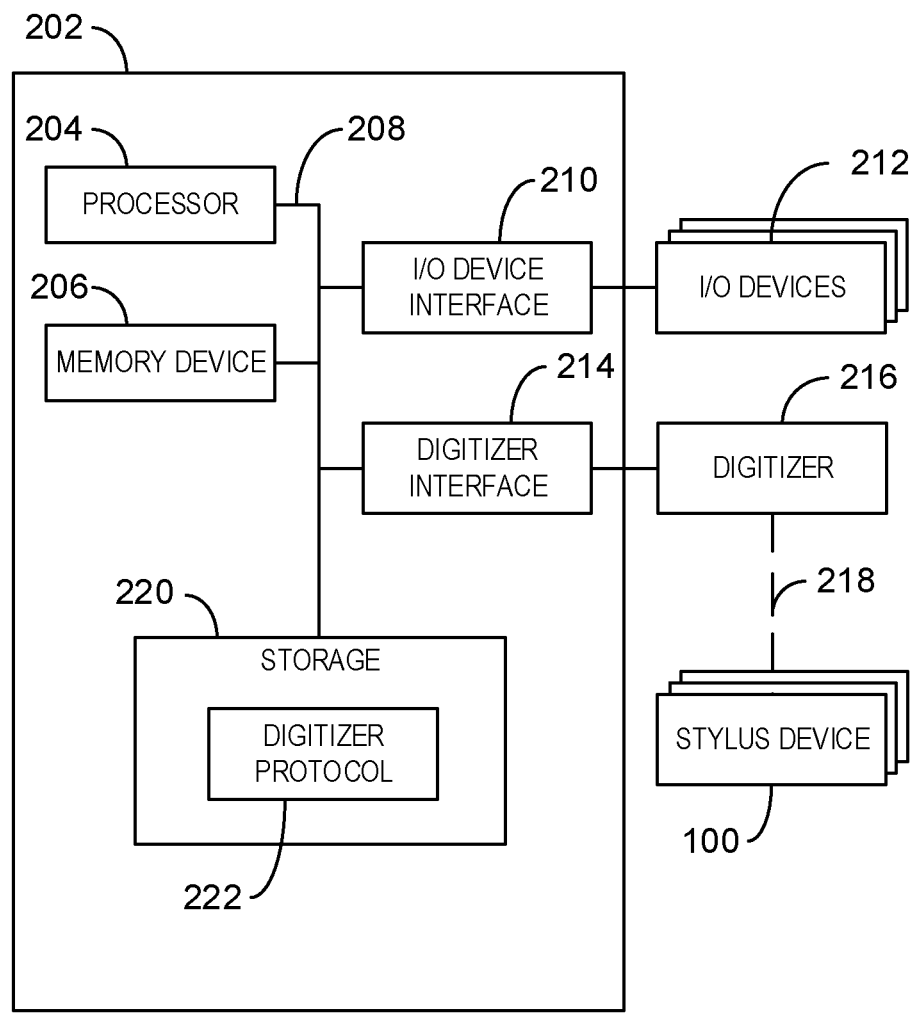
FIG. 2 is a block diagram of an example computing device with a display screen capable of receiving digital ink from an active stylus.

The active stylus 100 includes a stylus electrode 116 which is electrically conductive and configured to receive electrical signals from the electrodes of a digitizer, such as the digitizer 216 of FIG. 2. The stylus electrode 116 is also configured to send electrical signals to the electrodes of the digitizer. The primary data channel between the active stylus 100 and the digitizer is through the stylus electrode 116. As used herein, the term uplink refers to the transmission of data from the digitizer to the stylus 100, and the term downlink refers to the transmission of data from the stylus 100 to the display device.

The stylus electrode 116 is operatively coupled to the pressure sensor 104 and configured to detect a pressure when the stylus electrode 116 is pressed against a surface. The pressure sensor 104 may include one or more force sensitive resistors. A touch pressure value of the pressure sensor 104 may be sent to the controller 318.

As shown, the stylus electrode 302 is operatively coupled to the transmitter 110 and receiver 108. The transmitter 110 receives signal data from the controller 102 to be transmitted to the digitizer through the electrode 116. The transmitter 110 can include any suitable circuitry for converting digital data received from the controller to analog signals and amplifying the analog signals for transmission by the electrode 116. The receiver 108 receives data from the digitizer through the electrode 116 and sends the data to the controller 102 for further processing. The receiver 108 can include any suitable circuitry for amplifying analog signals received from the digitizer and converting the analog signals to digital data to facilitate subsequent processing by the controller 102.

In some embodiments, the stylus 100 also includes a radio link 118 that enables communication between the stylus 100 and a computing device associated with the display screen through an auxiliary side channel. The radio link 118 may be Bluetooth communication module, such as a Bluetooth Low Energy (BLE) module. The input buttons 106 may be configured to activate various features of the stylus and/or initiate a transfer of data to the computing device associated with the display screen. For example, the input buttons 106 may be used to initiate an erase mode, initiate a Bluetooth pairing between the stylus 100 and the computing device, or activate an application on the computing device, among others.

The active stylus 100 is configured to be able to communicate with the digitizer in accordance with two or more possible communication protocols depending on the protocol used by the digitizer. Two of the possible communication protocols include those protocols referred to herein as the first protocol (e.g., OutCell) and the second protocol (e.g. InCell). Features of the first and second protocol are described further in relation to FIGS. 3 and 4.

Additionally, the stylus controller 102 is configured to detect a stylus capture event based, at least in part, on information received from an associated computing device through the digitizer, for example. If a stylus capture event is detected, the stylus 100 can take measures to correct the issue. For example, upon detection of the stylus capture event, the stylus 100 can switch back to the first protocol, in which case the user can continue inking on the correct display device with minimal or no interruption. Additionally, the stylus 100 may also reduce the gain setting of its receiver 108, which reduces the potential for detecting beacons from the display device that uses the second protocol. Embodiments for detecting and mitigating the effects of stylus capture are described further in relation to FIGS. 5-8.

It is to be understood that the illustration of FIG. 1 is not intended to indicate that the stylus 100 and computing device 114 are to include all of the components shown in FIG. 1. Rather, the stylus 100 and computing device 114 can include fewer or additional components not illustrated in FIG. 1, e.g., additional applications, additional modules, additional memory devices, additional network interfaces (not shown), and the like. For example, the stylus 100 may also include a battery for powering components of the stylus 100. Additionally, the stylus 100 may include an additional electrode disposed at the opposite end of the stylus from the electrode 116. Such additional electrode may be configured to operate as a digital ink eraser, for example. The stylus 100 may also include one or more sensors for detecting a tilt angle of the stylus 100 relative to the display screen. Further, the stylus 100 is not limited to the modules shown as any combinations of the code used to implement these functions can be implemented.

FIG. 2 is a block diagram of an example computing device with a display screen capable of receiving digital ink from an active stylus. One or more of the active styluses shown in FIG. 2 can be the active stylus 100 from FIG. 1. The computing device 202 can be a tablet computer, a smart phone, a laptop computer, a personal digital assistant (PDA), or similar device that can interface with a stylus such as the stylus 100. In some embodiments, the computing device 202 may be a desktop computer, for example. The computing device 202 can include a processor 204 that is adapted to execute stored instructions, as well as a memory device 206 that stores instructions that are executable by the processor 204. The processor 204 can be a single core processor, a multi-core processor, a computing cluster, or any number of other configurations. The memory device 206 can include random access memory (e.g., SRAM, DRAM, zero capacitor RAM, SONOS, eDRAM, EDO RAM, DDR RAM, RRAM, PRAM, etc.), read only memory (e.g., Mask ROM, PROM, EPROM, EEPROM, etc.), flash memory, or any other suitable memory systems. The instructions that are executed by the processor 204 can be used to implement the authentication techniques of a stylus device as described herein.

The processor 204 may be connected through a system bus 208 (e.g., a proprietary bus, PCI, ISA, PCI-Express, HyperTransport®, etc.) to an input/output (I/O) device interface 210 adapted to connect the computing device 202 to one or more I/O devices 212. The I/O devices 212 can include, for example, a camera, a gesture recognition input device, a keyboard, a pointing device, a voice recognition device, and a monitor or other type of display screen, among others. The pointing device may include a touchpad or a touchscreen, among others. The I/O devices 212 can be built-in components of the computing device 202, or can be devices that are externally connected to the computing device 202.

The processor 204 can also be linked through the system bus 208 to a digitizer interface 214 configured to connect the computing device 202 to receive and interpret information from a digitizer 216. The digitizer 216 may integrated with a display screen such that interactions between the active stylus and the digitizer 216 simulate the effect of drawing on the display screen with the stylus. The display screen may a built-in component of the computing device 202 or the display screen may be externally connected to the computing device 202, such as a computer monitor, television, or projector, among others. The stylus 100 can transmit information through a digitizer channel 218 when the stylus device 100 is touching or within a hover range of the digitizer 216. In embodiments, the hover range for the digitizer channel 218 can be any suitable distance between the tip of the stylus device 100 and the digitizer 216, for example, around 10 mm to 20 mm.

Various techniques may be used to enable the digitizer to determine the position of the stylus. In some embodiments, position detection is performed by the stylus based on the timing and amplitude of signals received from the digitizer electrodes. The stylus may then calculate the position locally and transmit the calculated position to the digitizer, or the stylus may transmit the detected position information to the digitizer for further processing. In some embodiments, the position detection is performed by the digitizer based on which row and column detects a higher amplitude signal from the stylus electrode. In some embodiments, position detection may be based on a combination of the above techniques. For example, the digitizer may detect a position along a X-axis, while the stylus detects a position along a Y-axis and transmits the position information to the digitizer in a data downlink.

Storage 220 can be coupled to the processor 204 through the bus 208. The storage 220 can include a hard drive, a solid state drive, an optical drive, a USB flash drive, an array of drives, or any combinations thereof. The storage 220 can include software applications, drivers, operating systems, and other computer code configured to direct the operations of the computing device. In some embodiments, the storage 200 can include computer code configured to communicate with and/or control the operations of the digitizer 216 in accordance with the techniques described herein. In some embodiments, some or all of the operations of the digitizer 216 described herein may be directed by logic residing on the digitizer itself.

The storage 220 can include programming for executing a digitizer protocol 222 that facilitates communication between the digitizer 216 and the active stylus 100. Although the computing device 202 may be programmed to use more than one such protocol, the digitizer protocol 22 will generally be either the first protocol (e.g., OutCell) or the second protocol (e.g. InCell). To enable communication between the stylus 100 and digitizer 216, both devices establish time synchronization with one another so that both devices have a common reference for when various types of data packets can be sent or received. The communication protocols are described further in relation to FIGS. 3 and 4.

After the stylus 100 and digitizer 216 are synchronized, the stylus 100 is able to communicate with the digitizer 216 through the digitizer channel 218. Information that can be transmitted by the stylus to the digitizer includes position information related to the position of the stylus relative to the electrodes of the digitizer, whether the tip of the stylus is pressing against a surface, and others. The determination of whether the tip is pressing against a surface is accomplished using the pressure sensor 104 in the stylus 100. If pressure is detected, this information is transmitted to the digitizer, which uses the information to indicate that the user is inking, i.e., drawing on the display screen. The position information and inking indication can be used to generate graphics to be displayed on the display screen associated with the digitizer 216. Other information, such as a battery charge level of the stylus 100 may also be transmitted to the digitizer 216 through the digitizer channel 218.

Figure 3:
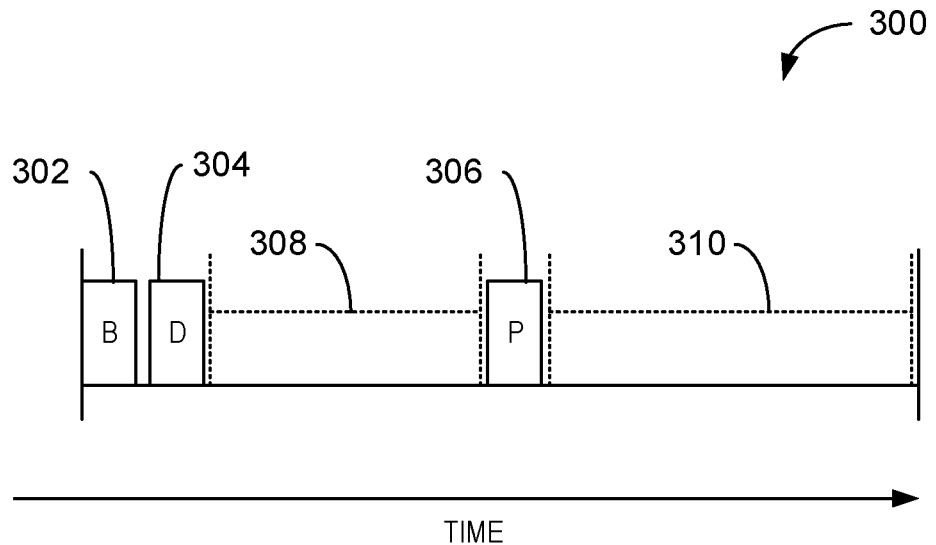
FIG. 3 is a diagram showing an example of the first protocol for communication between an active stylus and digitizer.

FIG. 3 is a diagram showing an example of the first protocol for communication between an active stylus and digitizer. The first protocol is compatible with digitizers that use stylus-initiated synchronization. Examples of the first protocol include MPP 2.0 OutCell and MPP 2.5 OutCell. Shown in FIG. 3 is a single sensing frame wherein signals can be exchanged between the stylus and digitizer through the digitizer channel according to the first protocol.

The frame 300 includes a beacon portion 302, a data portion 304, and a pressure portion 306. During the beacon portion 302, the active stylus transmits a stylus-initiated synchronization waveform that may be received by the digitizer. The digitizer may use the stylus-initiated synchronization waveform to change its timing to match the timing of the stylus. Additionally, the stylus-initiated synchronization waveform may also be used by the digitizer to determine a position of the stylus relative to the electrodes of the digitizer. During the data portion 404, the active stylus transmits digital data to the digitizer. For example, such digital data may include button status information, stylus ID, and battery status information. During the pressure portion 406, the active stylus transmits pressure information of the active stylus to the digitizer, which may be used to determine whether the stylus is inking.

The frame 300 has a duration of time, T1. In one example, the duration, T1 is about 15 milliseconds, and the different transmit portions 302, 304, and 306 have a duration of about 1.3 milliseconds. This example is meant to be non-limiting and the frame and/or the transmit portions 302, 304, and 306 of the frame 300 may be of any suitable duration. The frame 300 also includes detection portions 308 and 310 in between the transmit portions 302, 304, and 306. During the detection portions 308 and 310, the active stylus 100 does not transmit any signals, and the receiver of the active stylus may turn on a receiving path and listen for beacons related to the second protocol, which uses digitizer-initiated synchronization. Thus, detection portions 308 and 310 allow an opportunity for the stylus to detect the presence of a display that uses digitizer-initiated synchronization, and potentially become synchronized to it.

Figure 4:
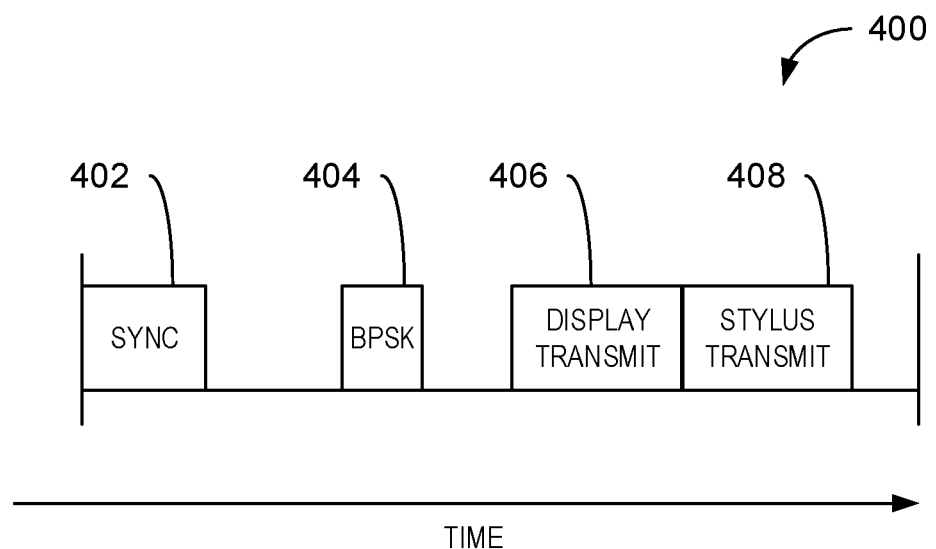
FIG. 4 is a diagram showing an example second protocol for communication between an active stylus and digitizer.

FIG. 4 is a diagram showing an example second protocol for communication between an active stylus and digitizer. The second protocol is compatible with digitizers that use digitizer-initiated synchronization. An example of the second protocol includes MPP 2.5 InCell. Shown in FIG. 4 is a single sensing frame wherein signals can be exchanged between the stylus and digitizer through the digitizer channel according to the second protocol.

The frame 400 includes a beacon portion 402, a phase-shift keying portion 404, a display-transmit portion 406, and a stylus-transmit portion 408. During the beacon portion 402, the digitizer transmits the digitizer-initiated synchronization waveform that may be used by the active stylus to synchronize itself to the display. During the phase-shift keying portion 404, the digitizer can transmit one or more bits of information using a modulation scheme such as Binary Phase-Shift Keying (BPSK) that permits the information to be reliably transmitted through the digitizer channel to the active stylus. During the display-transmit portion 406, the digitizer excites rows or columns of electrodes in order to detect electrical characteristics that relate to the position of the active stylus. During the stylus-transmit portion 406, the active stylus may drive its electrode to enable the digitizer to sense its position and/or to send encoded data to the digitizer. The second frame 402 has a duration of time, T2, that may be different from the duration, T1, of the frame 300 corresponding to the first protocol. In one example, the duration, T2, is about 8.5 milliseconds.

It will be appreciated that the sensing frame 300 and the sensing frame 400 are provided as non-limiting examples, and a variety of differently-constructed sensing frames may be used. For example, the sensing frames may have different frame durations, frame rates, sub-intervals for different transmissions, etc.

The first protocol is used as a default mode of operation of the active stylus 100. Further, when operating in accordance with the first protocol and not transmitting, the active stylus 100 can listen for the presence of a display device that uses the second protocol, in order to potentially switch from the first protocol to the second protocol. Specifically, the stylus can listen for a beacon from a device using the second protocol. In response to the detection of a beacon 402 related to the second protocol, the stylus controller may cause the controller to switch from the first protocol to the second protocol.

In some instances, it may be possible for the user to ink on more than one device. For example, the user may be holding a small form factor device such as a smart phone or tablet PC. Additionally, the user may be standing next to a large form factor device such as a large computer monitor or television. The user can switch between the two devices, inking on one and then the other. When the active stylus is inking on a device, the stylus can switch to the communication protocol supported by that device. Protocols such as OutCell, which use stylus initiated synchronization, tend to be used in small form factor devices, while protocols such as InCell, which use digitizer-initiated synchronization, are more widely used in large devices. Furthermore, the signals emitted by the digitizer of a large form factor device will often be higher power to overcome the noise generated by the AC power line and to allow the active stylus to synchronize with the screen before the user begins inking. Accordingly, beacons related to the InCell protocol can sometimes be detected over distances of up to 2 meters. These factors can lead to what is referred to herein as stylus capture, wherein the larger InCell device causes the active stylus to switch to the InCell protocol even through the user is actually trying to ink on a device that uses the OutCell protocol. In such cases, the user will be unable to ink on the OutCell device and may not realize the reason for the malfunction.

The stylus and digitizer are configured to enable the stylus to determine when stylus capture has occurred. The detection of stylus capture may be based, at least in part, data received by the stylus from the digitizer. For example, if the digitizer detects data packages of an active stylus this indicates that a stylus is in close proximity to the screen. The digitizer can send information to the stylus indicating that at least one active stylus has been detected by the digitizer. Additionally, if the active stylus is detecting pressure at the electrode, this usually indicates that the user is trying to ink. If pressure is detected, but the digitizer reports that no stylus is detected, this may indicate that the stylus has been captured and is not communicating with the correct device.

Figure 5:
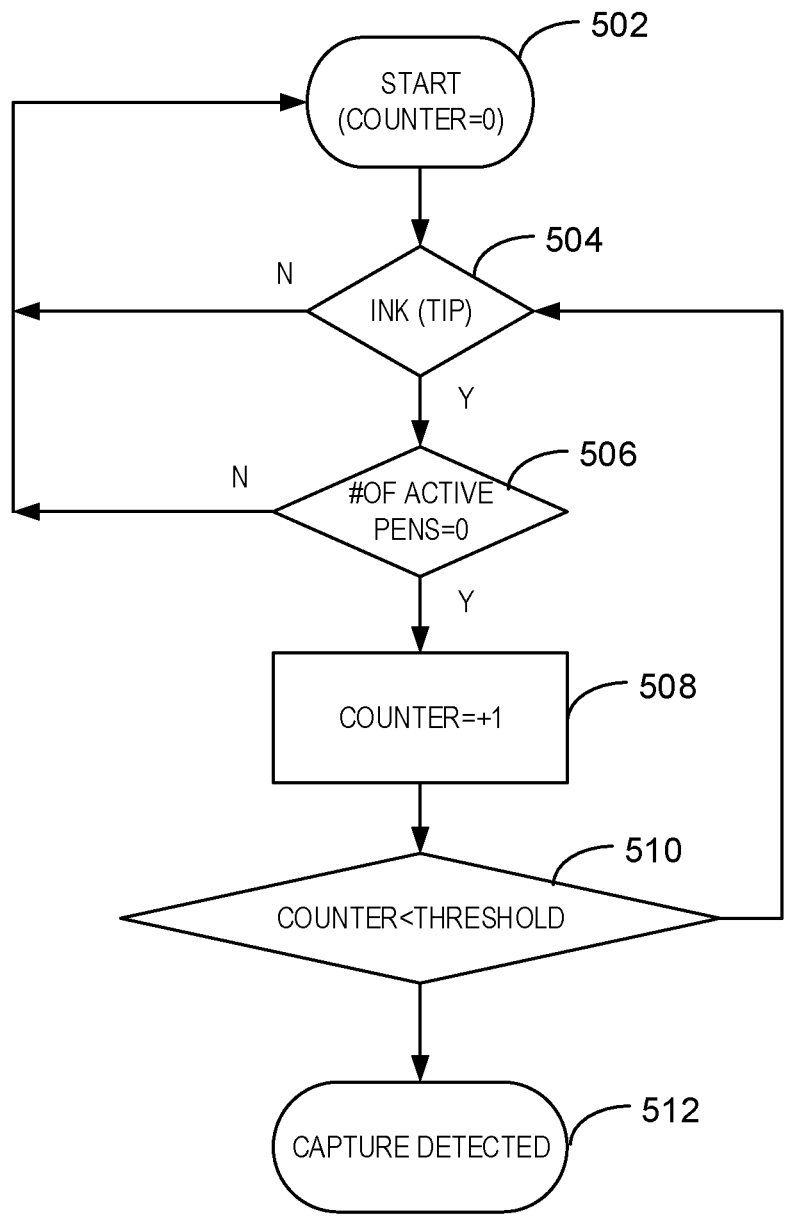
FIG. 5 is a process flow diagram for an example method of detecting a stylus capture event.

FIG. 5 is a process flow diagram for an example method of detecting a stylus capture event. The method may be performed by circuitry residing on the active stylus, for example, the controller 102. The process starts at block 502. The process may begin once the active stylus has been powered on and can continue running until the stylus is turned off. In some embodiments, the process begins once the stylus switches to the second protocol (e.g., InCell) and continues to run until the stylus switches to the first protocol (e.g., OutCell).

At block 502, a counter maintained by the controller 102 is initialized, e.g., set to zero. The use of the counter provides a mechanism by which to measure the duration of a potential stylus capture event. In this way, the stylus is less likely to respond to transient conditions.

At block 504, a determination is made regarding whether the stylus is in an inking mode. This can be determined by the controller 102 based on the pressure data received by the controller 102 from the pressure sensor 104. If the pen is not inking, the process returns to block 502 and the counter is restarted, e.g., set to zero.

At block 506, a determination is made regarding whether the digitizer is currently detecting any active styluses. This can be determined by the controller 102 based on data received from the digitizer. The digitizer is able to detect active styluses based on signals received from the stylus through the digitizer channel, i.e., transmitted by the transmitter 110 through the electrode 116. If data or an excitation signal is received from a stylus through the digitizer channel, this indicates that the stylus is either inking on the display or at least hovering over the display. The display can include information about the number of active styluses in a data packet sent back to the stylus controller 102 through the digitizer channel. This information can be sent from the digitizer to the receiver 108 through the electrode 116 during the display-transmit portion 406 of the data frame 400, for example. The information may be the number of styluses or an indicator that at least one stylus was detected. If the number of active styluses is greater than zero, the process returns to block 502 and the counter is restarted, e.g., set to zero.

If the stylus is in inking mode and the number of active styluses reported by the digitizer is zero, then the process flow advances to block 508 and the counter is incremented by 1. At block 510, the controller determines whether the counter is above a specified threshold. If the counter is a below the threshold, the process flow returns to block 504. If the counter is above the threshold, the process flow advances to block 512 and a stylus capture event is identified. The stylus controller 102 can respond to the stylus capture event by switching back to the first protocol (e.g., OutCell). Other actions may also be performed depending on the details of a specific implementation. For example, the controller 102 can log the stylus capture event to the memory 112, or the controller 102 can notify other devices about the stylus capture event by transmitting data packets to the display through the digitizer channel (transmitter 110 and electrode 116) or a separate side channel (e.g., radio link 118). In some examples, the stylus controller 102 may respond to the stylus capture event by changing the gain level applied to the stylus's receiver 108. Reducing the gain reduces the amplification of the received signals, thereby decreasing the sensitivity of the stylus to beacons from the InCell display.

The method may be repeated continuously at a suitable cycle rate. In some examples, the cycle rate for performing the method may be approximately equal to the frame rate of the communication protocol in use by the stylus. The method 500 should not be interpreted as meaning that the blocks are necessarily performed in the order shown. Furthermore, fewer or greater actions can be included in the method 500 depending on the design considerations of a particular implementation.

Figure 6:
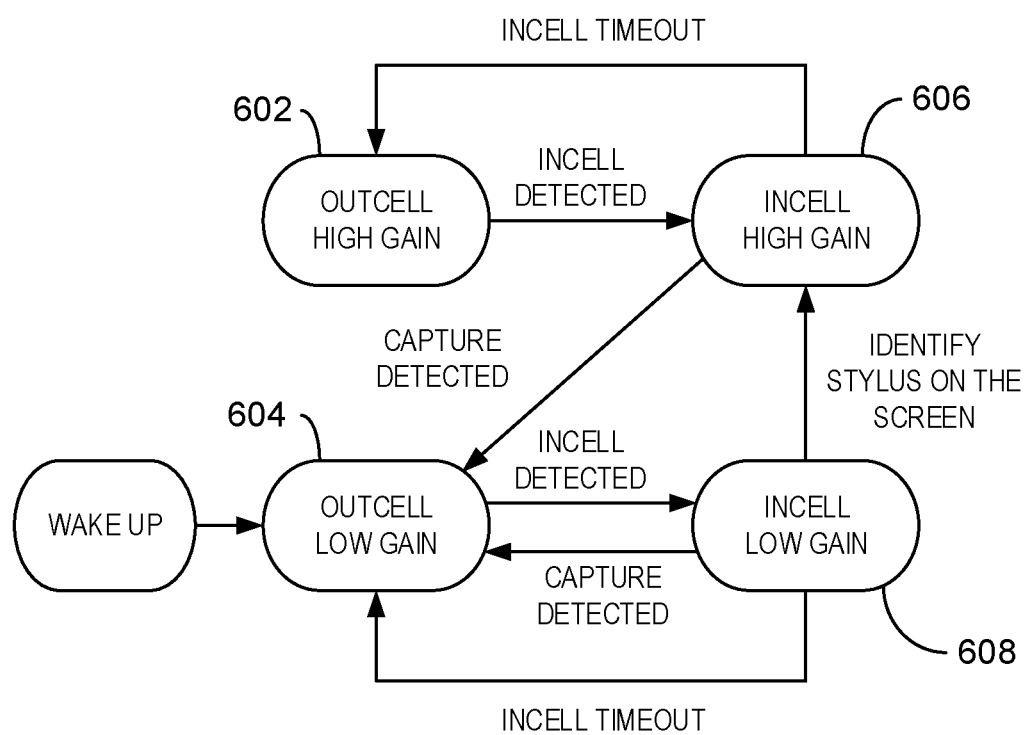
FIG. 6 is an example state machine for implementing anti-capture in an active stylus.

FIG. 6 is an example state machine for implementing anti-capture in an active stylus. The state machine describes four states, OutCell high gain (block 602), OutCell low gain (block 604), InCell high gain (block 606), and InCell low gain (block 608). The OutCell and InCell states indicate the particular protocol being used by the stylus. Although InCell and OutCell are described, it will be appreciated that other protocols may also be used. The high gain and low gain states refer to the gain (i.e., amplification) applied by the stylus circuitry to the signal received from the digitizer through the digitizer channel. High gain generally results in a more sensitive stylus that is able to communicate more reliably and over longer distances. The gain levels implemented may depend on various implementation details, such as the effective power emitted by digitizer. In some examples, the gain may be approximately 0 decibels (dB) in high gain state and −9 dB in low gain state.

The state machine of FIG. 6 shows that the stylus is configured to enter the OutCell low gain state 604 upon waking. As a part of the communication protocol, the stylus will begin sending OutCell beacons 302 as described above in relation to FIG. 3. If beacons from the InCell protocol are detected ("InCell detected"), the stylus transitions to the InCell low gain state at block 608. Upon switching to InCell, the stylus will receive the synchronization waveform from the digitizer and alter its cycle timing to coincide with the digitizer.

While at block 608, if a stylus is detected on the display screen ("identify stylus on the screen"), the stylus transitions to InCell high gain at block 606. The stylus may be detected on the screen when the digitizer detects a signal from the stylus through the digitizer channel Results of the detection are communicated to the stylus through the digitizer channel Switching to high gain improves the communication between the stylus and digitizer. Once the stylus has been detected by the digitizer, the risk of a stylus capture event is low, since it has been confirmed that the user is attempting to ink on the InCell device.

InCell timeout means that the stylus is not receiving a signal from the InCell device. This could happen if the stylus is too far away from the InCell digitizer to receive a signal from the InCell digitizer. If there is an InCell timeout, the stylus transitions to back to the OutCell protocol but maintains the same gain. Accordingly, the state machine will transition from block 608 to block 604 (or from lock 606 to block 602) upon InCell timeout and will transition back to InCell if InCell beacons are detected.

If stylus capture is detected at either block 606 or 608, the stylus returns to the OutCell low gain state at block 604. Reducing the gain makes it less likely that the stylus will detect another InCell beacon, thereby reducing the likelihood of additional stylus capture events.

Figure 7:
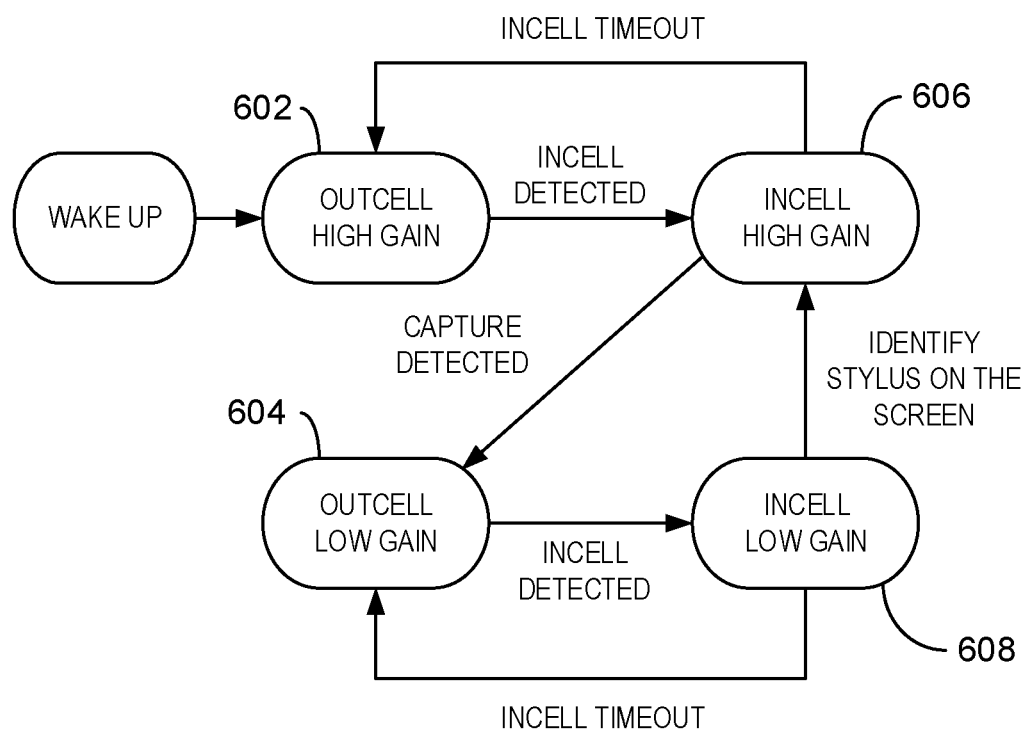
FIG. 7 is another example state machine for implementing anti-capture in an active stylus.

FIG. 7 is another example state machine for implementing anti-capture in an active stylus. The states and state transitions shown in FIG. 7 are the same as those described in relation to FIG. 6. However, rather than waking in the OutCell low gain state (block 604), the stylus wakes in the OutCell high gain state (block 602). Thus, the stylus will start at the high gain state and remain in the high gain state unless a stylus capture event is detected. The stylus then stays in the low gain state until it is confirmed that the stylus has been detected on the InCell digitizer.

Figure 8:
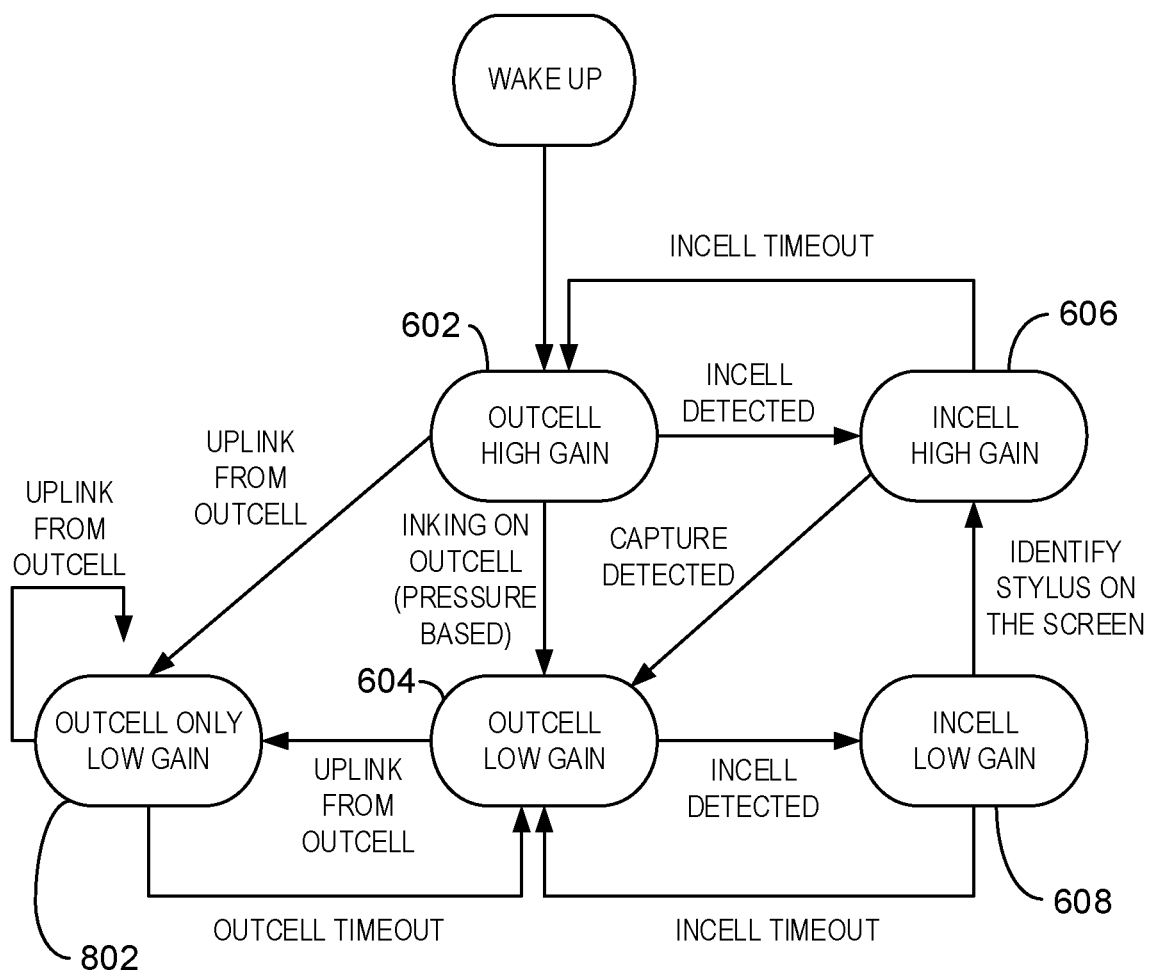
FIG. 8 is another example state machine for implementing anti-capture in an active stylus.

FIG. 8 is another example state machine for implementing anti-capture in an active stylus. The states and state transitions shown in FIG. 8 are similar to those described in relation to FIG. 7. Specifically, the state machine of FIG. 8 includes the OutCell high gain (block 602), OutCell low gain (block 604), InCell high gain (block 606), and InCell low gain (block 608) states. However, the state machine of FIG. 8 also includes an additional state referred to herein as OutCell only, low gain (block 802). The stylus is configured to enter the OutCell high gain state 604 upon waking.

As shown in FIG. 8, the stylus is configured to transition to the OutCell only, low gain state (block 802) any time that the stylus is operating in OutCell mode and an uplink is received from a digitizer through the OutCell protocol. The uplink indicates that the stylus is in communication with the digitizer and is therefore likely to be in close proximity to the display screen. While at block 802, any beacons received by the stylus from an InCell device will be ignored by the stylus and will not cause a state transition or cause the stylus to switch to the InCell protocol. The stylus will remain at block 802 as long as the stylus continues to receive an uplink from the digitizer.

OutCell timeout means that the stylus has not receiving a signal from the OutCell device for a specified amount of time. This could happen if the stylus is too far away from the OutCell digitizer to receive a signal from the OutCell digitizer. From block 802, if there is an OutCell timeout, the stylus transitions to block 604, and the stylus continues to use the OutCell protocol and same gain but now has the ability to transition to the InCell protocol.

Additionally, the state machine of FIG. 8 includes a new state transition from OutCell high gain (block 602) to OutCell low gain (block 604). The transition from block 602 to block 604 can occur when the stylus detects pressure on its electrode that indicates the user is inking. If inking is detected during use of the OutCell protocol, the stylus transitions to low gain to reduce the likelihood of detecting InCell beacons. The gain can be reduced without reducing communication performance, because the inking detection indicates that the stylus electrode is in contact with the display screen and is therefore very close to the digitizer of the OutCell device.

Figure 9:
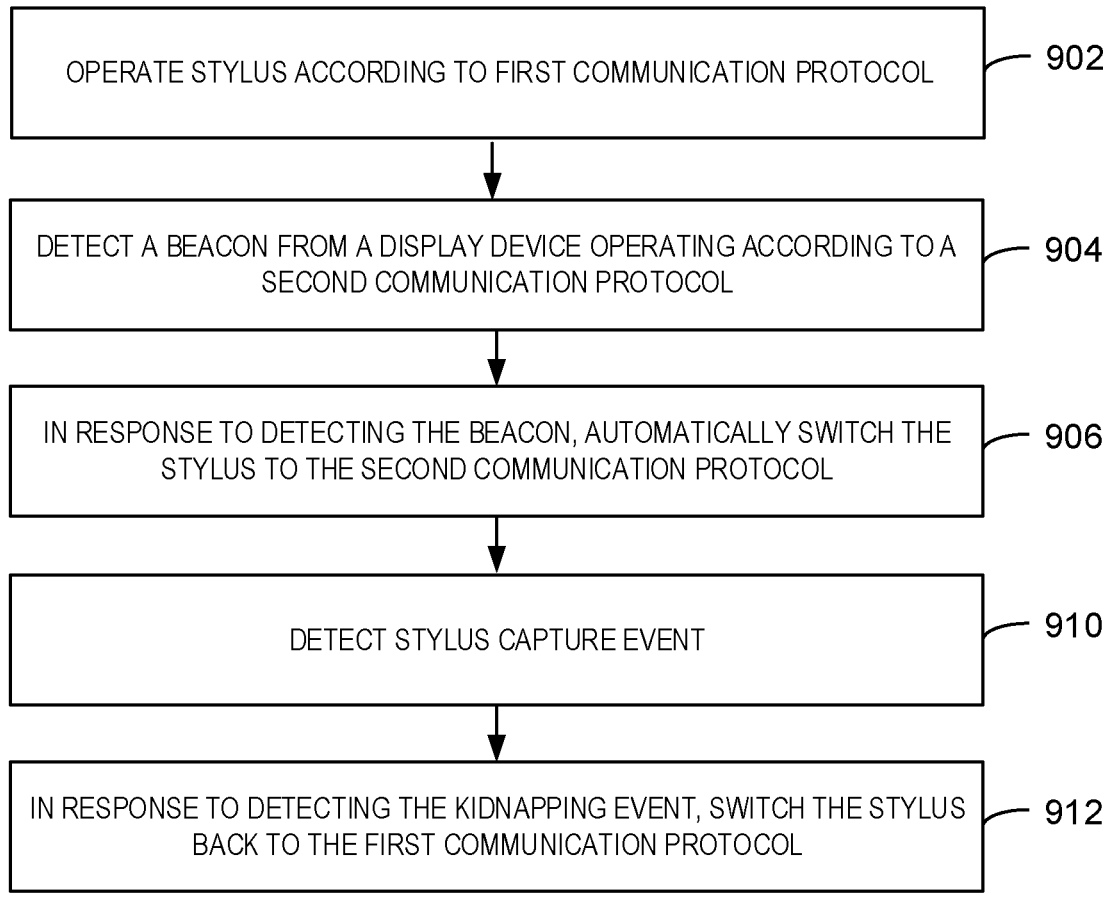
FIG. 9 is a process flow diagram summarizing a method of operating an active stylus.

FIG. 9 is a process flow diagram summarizing a method of operating an active stylus. The method 900 may be performed by the active stylus 100 described with respect to FIG. 1.

At block 902, the stylus is operated according to the first communication protocol. As explained above, the first protocol is a default protocol that uses stylus-initiated synchronization. The first protocol may be an OutCell protocol. The stylus may operate according to the first protocol upon waking.

At block 904, a beacon from a display device operating according to a second communication protocol is detected. The second protocol uses digitizer-initiated synchronization.

The second protocol may be an InCell protocol. The beacons may be received from the electrodes of a digitizer integrated with the display device.

At block 906, the stylus responds to the beacon by automatically switching to the second protocol for communicating with the digitizer. The stylus may also begin executing a stylus capture detection routine such as the one described above in relation to FIG. 5. During this time, the stylus may receive information from the digitizer indicating whether a stylus is being detected by the digitizer and/or how many stylus are being detected.

At block 908, a stylus capture event is detected by the stylus. The stylus capture event indicates that switching the stylus to the second communication protocol was erroneous and is preventing the user from communicating with the first display device. The stylus capture event may be detected if the stylus is in inking mode and the digitizer is reporting that no stylus has been detected by the digitizer. In some embodiments, the stylus capture event is detected if the above conditions are met for a specified number of cycles or a specified amount of time.

At block 910, the stylus responds to the stylus capture event by switching back to the first communication protocol. Additional actions may also be performed to reduce the likelihood of encountering another stylus capture event, such as reducing the sensitivity of the stylus by reducing the gain level applied to its receiver circuitry. Other actions, such as recording the stylus capture event or reporting the stylus capture event to the user or to the digitizer are also possible.

The process flow diagram of FIG. 9 is not intended to indicate that the steps of the method 900 are to be executed in any particular order, or that all of the steps of the method 900 are to be included in every case. Further, any number of additional steps may be included within the method 900, depending on the specific application.

Figure 10:
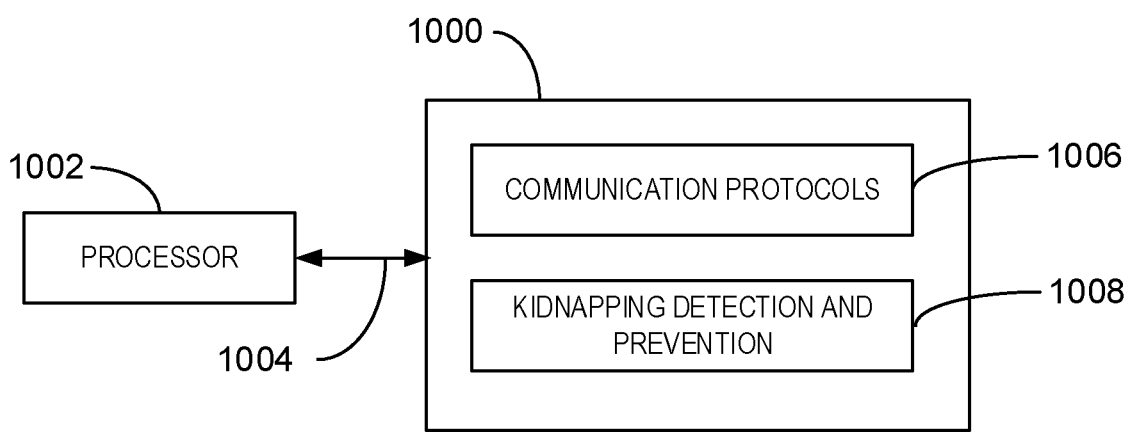
FIG. 10 is a block diagram showing computer-readable storage media 1000 that can store instructions for operating an active stylus.

FIG. 10 is a block diagram showing computer-readable storage media 1000 that can store instructions for operating an active stylus. The computer-readable storage media 1000 may be accessed by a processor 1002 over a computer bus 1004. Furthermore, the computer-readable storage media 1000 may include code to direct the processor 1002 to perform steps of the techniques disclosed herein.

The computer-readable storage media 1000 can include code to enable the stylus to operate according to one of a set of communication protocols 1006, such as the MPP InCell and MPP OutCell protocols. Further, the computer-readable storage media 1000 can include a capture detection and prevention routine 1008, which operates according to the techniques described herein. For example, the capture detection and prevention routine 1008 can cause the stylus to switch back to the first protocol if a stylus capture event is detected. Additionally, the capture detection and prevention routine 1008 can control the sensitivity of the stylus's receiver based on the detection of various conditions as described above in relation to FIGS. 6-8. It is to be understood that any number of additional software components not shown in FIG. 10 may be included within the computer-readable storage media 1000, depending on the specific application.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for operating a stylus, comprising:
   operating the stylus according to a first communication protocol to enable communication with a first display device that uses the first communication protocol;
   detecting a beacon from a second display device operating according to a second communication protocol, wherein the second communication protocol is different from the first communication protocol;
   in response to detecting the beacon, automatically switching the stylus from the first communication protocol to the second communication protocol to enable communication with the second display device;
   detecting a stylus capture event indicating that switching the stylus to the second communication protocol was erroneous and is preventing the user from using the stylus with the first display device; and
   in response to detecting the stylus capture event, switching the stylus from the second communication protocol back to the first communication protocol to enable communication with the first display device.

2. The method of claim 1, wherein the first communication protocol is a Microsoft Pen Protocol (MPP) OutCell protocol and the second communication protocol is an MPP InCell protocol.

3. The method of claim 1, wherein the first communication protocol uses stylus-initiated synchronization and the second communication protocol uses digitizer-initiated synchronization.

4. The method of claim 1, wherein communication between the stylus and the second display device occurs between an electrode of the stylus and one or more electrodes of a digitizer included in the second display device.

5. The method of claim 1, wherein the stylus comprises a receiver for communicating with the second display device through a digitizer channel, the method further comprising reducing a gain of the receiver in response to detecting the stylus capture event.

6. The method of claim 1, comprising receiving an indicator from the second display device that indicates whether the stylus is detected on a display screen of the second display device, wherein the indicator is received by the stylus in a data packet transmitted from a digitizer of the second display device to a receiver of the stylus.

7. The method of claim 1, wherein detecting the stylus capture event comprises:
   determining that the stylus is in inking mode based on a pressure detected by a pressure sensor coupled to an electrode of the stylus; and
   determining that the second display device is not detecting the stylus on a display screen of the second display device.

8. The method of claim 1, comprising:
   receiving an uplink from the first display device using the first communication protocol, wherein the uplink comprises a transmission received from a digitizer of the first display device through an electrode of the stylus;
   in response to the uplink, preventing the stylus from switching to the second communication protocol; and
   if no uplinks are received for a specified amount of time, allowing the stylus to switch to the second communication protocol.

9. The method of claim 1, comprising increasing the stylus sensitivity if the stylus is operating in the second communication protocol and the second display device detects the stylus on a display screen of the second display device.

10. The method of claim 1, comprising reducing the stylus sensitivity if the stylus is operating in the first communication protocol and the stylus is in inking mode.

11. An active stylus, comprising:
transmitter circuitry for sending electrical signals to a digitizer of a display device;
receiver circuitry for receiving electrical signals from the digitizer of the display device;
a processor for operating the active stylus according to a first communication protocol compatible with a first display device, or a second communication protocol compatible with a second display device, wherein the second communication protocol is different from the first communication protocol, the processor configured to:
operate the stylus according to the first communication protocol upon waking;
listen for beacons indicating the presence of the second display device operating according to the second communication protocol, and automatically switch the stylus from the first communication protocol to the second communication protocol if a beacon is detected;
perform a stylus capture detection routine while operating according to the second communication protocol, the stylus capture detection routine to determine whether the switch to the second communication protocol was erroneous, wherein the stylus capture detection routine is to determine whether a user is attempting to use the active stylus with the first display device; and
if the stylus capture detection routine detects that the switch to the second communication protocol was erroneous, switch the stylus from the second communication protocol back to the first communication protocol to enable communication with the first display device.

12. The active stylus of claim 11, wherein the first communication protocol is a Microsoft Pen Protocol (MPP) OutCell protocol and the second communication protocol is an MPP InCell protocol.

13. The active stylus of claim 11, wherein the first communication protocol uses stylus-initiated synchronization and the second communication protocol uses digitizer-initiated synchronization.

14. The active stylus of claim 11, comprising a stylus electrode coupled to the receiver circuitry and the transmitter circuitry, wherein communication between the stylus and the second display device occurs between the electrode and one or more electrodes of the digitizer.

15. The active stylus of claim 11, wherein the processor is to reduce a gain level applied by the receiver circuitry to reduce a sensitivity of the stylus if the stylus capture event is detected.

16. The active stylus of claim 11, wherein the processor is to receive an indicator from the second display device that indicates whether the stylus is detected on a display screen of the second display device, wherein the indicator is received by the stylus in a data packet transmitted from the digitizer of the second display device to a receiver of the stylus.

17. The active stylus of claim 11, wherein the processor detects a stylus capture event if the stylus is in inking mode based on a pressure detected by a pressure sensor coupled to an electrode of the stylus, and the second display device is not detecting the stylus via the digitizer of the second display device.

18. The active stylus of claim 11, wherein the processor is to:
listen for an uplink from the first display device using the first communication protocol, wherein the uplink comprises a transmission received from the digitizer of the first display device through an electrode of the stylus;
if an uplink is detected, block the stylus from switching to the second communication protocol; and
if no uplinks are received for a specified amount of time, allow the stylus switch to the second communication protocol.

19. The active stylus of claim 11, wherein the processor is to increase the stylus sensitivity if the stylus is operating in the second communication protocol and the digitizer of the second display device detects the stylus.

20. The active stylus of claim 11, wherein the processor is to reduce the stylus sensitivity if the stylus is operating in the first communication protocol and the stylus is in inking mode.

21. One or more non-transitory computer-readable storage media for storing computer-readable instructions, the computer-readable instructions providing a system for detecting a stylus capture event in an active stylus, the instructions, when executed, are configured to:
operate the stylus according to the first communication protocol upon waking;
listen for beacons indicating the presence of a display device operating according to the second communication protocol, and automatically switch the stylus from the first communication protocol to the second communication protocol if a beacon is detected, wherein the second communication protocol is different from the first communication protocol;
perform a stylus capture detection routine while operating according to the second communication protocol, the stylus capture detection routine to determine whether the switch to the second communication protocol was erroneous; and
if the stylus capture detection routine detects that the switch to the second communication protocol was erroneous, switch the stylus from the second communication protocol back to the first communication protocol to enable communication with the first display device.

22. The non-transitory computer-readable storage media of claim 21, wherein the first communication protocol is a Microsoft Pen Protocol (MPP) OutCell protocol and the second communication protocol is an MPP InCell protocol.

23. The non-transitory computer-readable storage media of claim 21, wherein the first communication protocol uses stylus-initiated synchronization and the second communication protocol uses digitizer-initiated synchronization.

24. The non-transitory computer-readable storage media of claim 21, comprising instructions to reduce a gain level applied by the receiver circuitry to reduce a sensitivity of the stylus if the stylus capture event is detected.

25. The non-transitory computer-readable storage media of claim 21, wherein the stylus capture event is detected if the stylus is in inking mode and the display device is not detecting the stylus via the digitizer.

* * * * *